United States Patent [19]

Koerber, Sr.

[11] Patent Number: 4,961,470
[45] Date of Patent: Oct. 9, 1990

[54] WEIGH BED HAVING VERTICAL LOAD LINK

[75] Inventor: Clement J. Koerber, Sr., Batesville, Ind.

[73] Assignee: Hill-Rom Company, Inc., Batesville, Ind.

[21] Appl. No.: 356,462

[22] Filed: May 25, 1989

[51] Int. Cl.$^5$ .................. G01G 19/52; G01G 3/14; A47C 19/00; A61G 7/06
[52] U.S. Cl. ............................ 177/144; 177/211; 5/60; 5/66
[58] Field of Search ................ 177/144, 211

[56] References Cited

U.S. PATENT DOCUMENTS 4,793,428 12/1988 Swersey .................. 177/144

OTHER PUBLICATIONS

Lebow (Eaton) Corp. Catalog pp. 5, 92, 93, and 94.

Primary Examiner—George H. Miller, Jr.
Attorney, Agent, or Firm—Wood, Herron & Evans

[57] ABSTRACT

A weigh bed having a support frame nested within a weigh frame. Vertical load links are connected between the load frame and weigh frame. The load links are attached to the respective frames by spherical bearings so as to eliminate any error in the weight measured arising out of the support frame being inclined at an angle to horizontal.

7 Claims, 3 Drawing Sheets

WEIGH BED HAVING VERTICAL LOAD LINK

This invention relates to a vertical load link, and more particularly, to a hospital bed for weighing patients wherein a vertical load link is employed. It is an improvement in the invention disclosed in copending U.S. application Ser. No. 07/138,829, filed Dec. 28, 1987, which disclosure forms a part of the present invention and is fully incorporated herein by reference.

BACKGROUND OF THE INVENTION

The bed of the prior application has as principal elements a support frame nested within a weigh frame but is not limited to this mechanism. The support frame is mounted on a base. The weigh frame carries a patient support. Four load beams, one mounted near each corner of the weigh frame, connect the weigh frame to the support frame. Each load beam consists of an elongated element which is fixed at one end to the support frame. The elongated element is cantilevered horizontally along the support frame and is connected at its free end by a vertical link to the weigh frame.

From time to time the support frame must be physically tilted with respect to horizontal to achieve a Trendelenburg position. The load beam measures only the component of the load that is perpendicular to the mounting plane or longitudinal axis of the elongated element that forms the principal component of the load beam. Therefore, as the support frame, and with it the load beam, is inclined from horizontal, the weight of a patient which is applied to the load beam in a direction perpendicular to horizontal will not be accurately measured by the load beam. The weight will be in error by the cosine of the angle of inclination. The greater the angle of inclination, the greater will be the error. In addition, there can be mechanical interferences at large angles of inclination that preclude accurate response of the load-sensing beams.

SUMMARY OF THE INVENTION

An objective of the present invention has been to provide a load sensor and a connection of the load sensor between the weigh frame and the support frame that will eliminate any error arising out of the inclining of the support frame with respect to horizontal.

This objective of the present invention is achieved by providing a vertically oriented load link connected at its upper and lower ends to the support frame and weigh frame, respectively. The load link is connected by an upper, integral, spherical bearing to the support frame and by a lower, integral, spherical bearing to the weigh frame. Thus, regardless of the orientation of the support frame with respect to horizontal, the load link will hang perpendicular to horizontal and parallel to the force of gravity. Hence, no error will arise out of the application of the force of a patient's weight to the load link at an angle other than one that is parallel to the axis of the load link.

While the load link is being described in particular relation to a weigh bed with nesting frames, it is to be understood that the invention has much wider application to other weighing environments. The unique load link with integral, spherical bearings can have application where a uni-axial sensor will eliminate extraneous forces from the weight sensed. Further, while a specific S-shaped link configuration is disclosed, it is to be understood that other configurations of load link with spherical bearings at each end are within the scope of the invention.

The connection of the weigh frame with respect to the support frame by means of freely-swinging vertically links will permit undesirable movement of the weigh frame and patient support with respect to the support frame. It is therefore another feature of the invention to provide a tie rod connection between support frame and load frame. It is further an additional feature of the invention to create a parallelogram linkage connection between the support frame and the weigh frame, the parallelogram linkage having as its four pivot points the two axes of the spherical bearings, the transverse axis about which the support frame is pivoted to shift to a Trendelenburg position and a pivot axis immediately below the Trendelenburg pivot axis. The tie rod is connected between the axis of the lower spherical bearing and the axis below the Trendelenburg axis. The tie rod, forming part of a parallelogram linkage, stabilizes the fore and aft relationship of the weigh frame with respect to the support frame while at the same time maintaining the load link in a vertical orientation regardless of the angle of inclination of the support frame.

BRIEF DESCRIPTION OF THE DRAWINGS

The objectives and features of the present invention will become more readily apparent from the following detailed description taken in conjunction with the accompanying drawings in which.

DETAILED DESCRIPTION OF THE INVENTION

Figure 1:
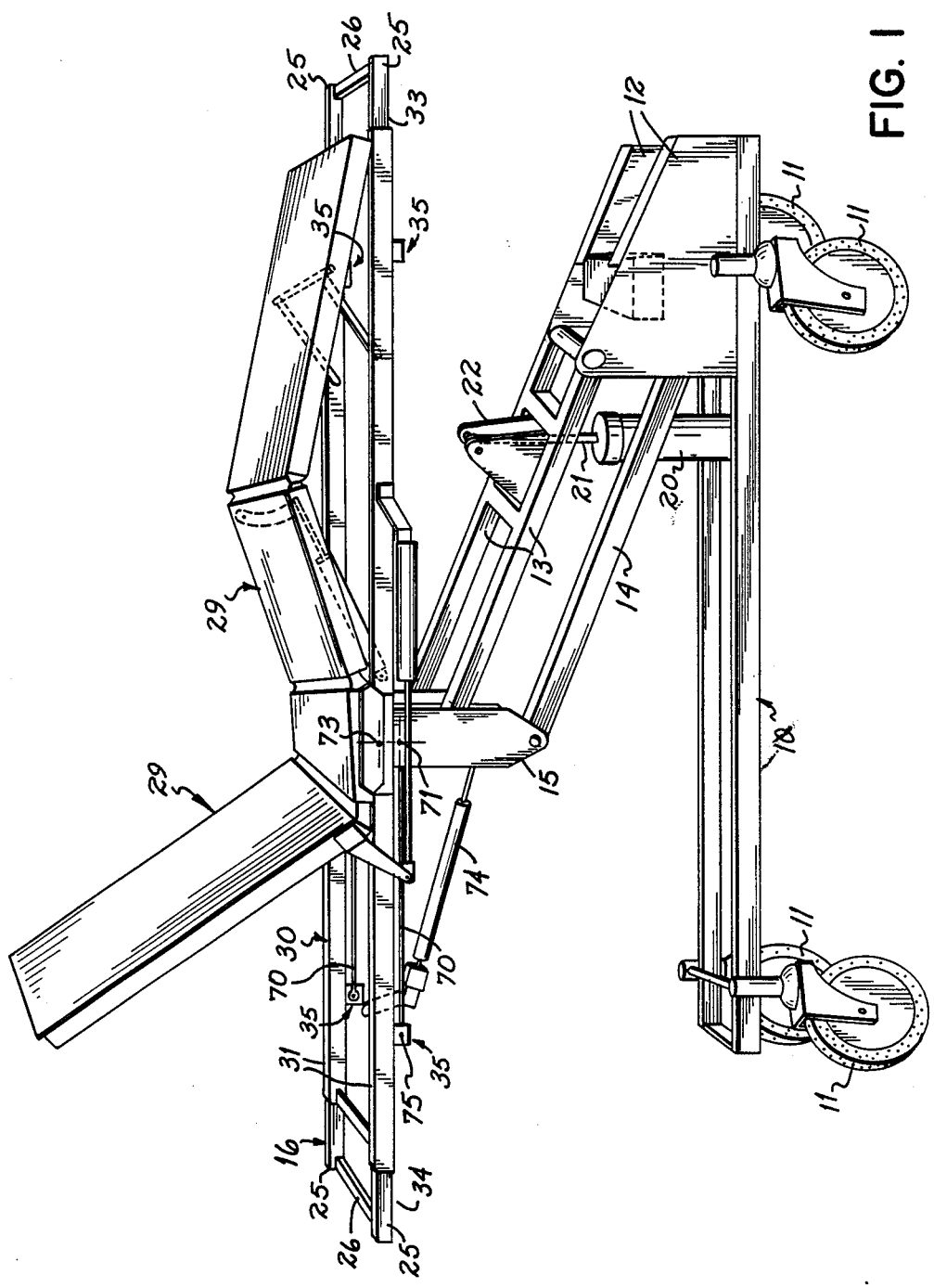
FIG. 1 is a diagrammatic perspective view of the bed of the present invention.
Figure 2:
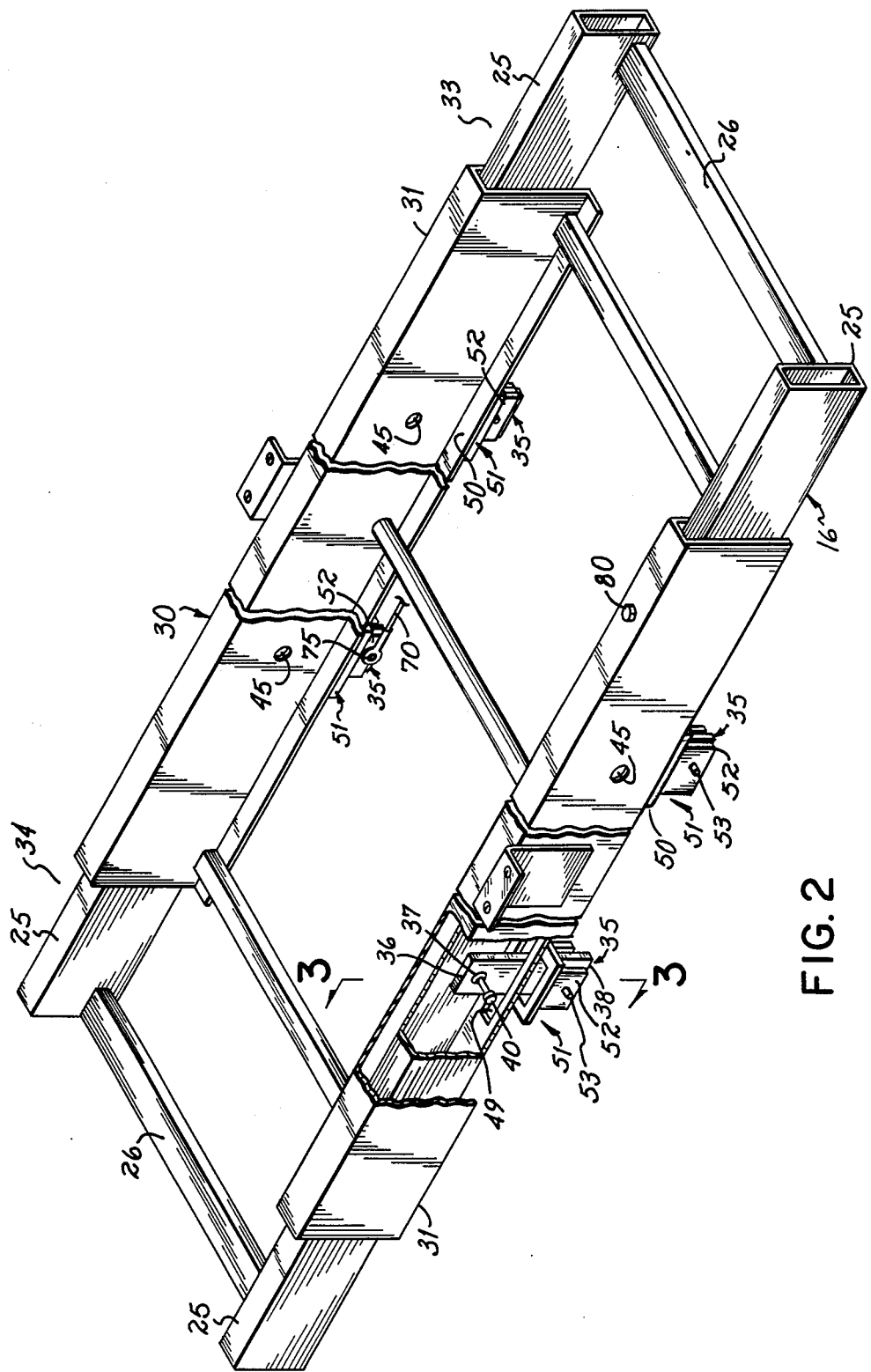
FIG. 2 is a diagrammatic perspective view, partly broken away, of the support frame and weigh frame.
Figure 3:
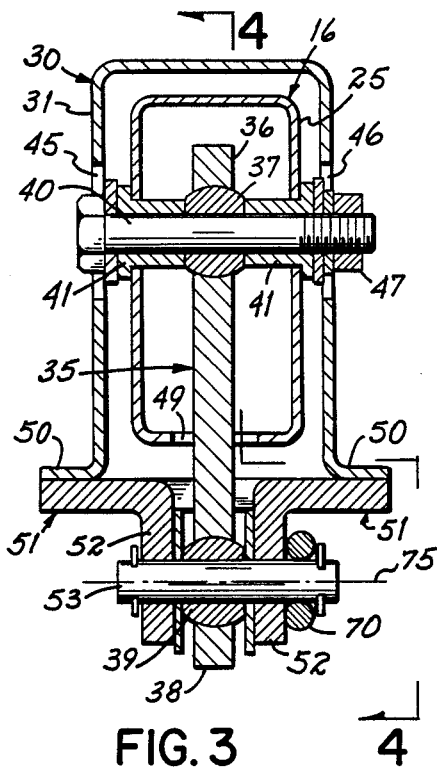
FIG. 3 is a cross-sectional view taken along lines 3—3 of FIG. 2.
Figure 4:
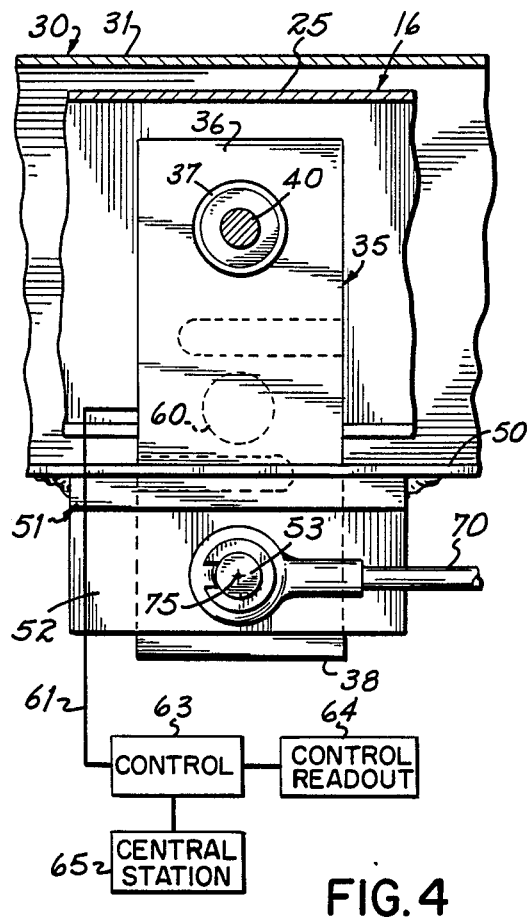
FIG. 4 is a cross-sectional taken along line 4—4 of FIG. 3.

The bed to which the present invention is applied is shown in FIG. 1. That bed is more fully described and claimed in copending application Ser. No. 7-034,232, filed Apr. 2, 1987 now U.S. Pat. No. 4,751,754. The details of that disclosure are incorporated herein by reference but, except as indicated, do not form a part of the present invention.

The bed has a base frame 10 that is supported on casters 11. Brackets 12 fixed to the base frame pivotally support the ends of a cantilevered support arm 13 and a stabilizer arm 14. The ends of the cantilevered support arms 13 and the stabilizer arm 14 are pivotally connected to a bracket 15, thereby providing a parallelogram linkage support for the bed. The bracket 15 is pivotally connected to a support frame 16 at 73. A piston and cylinder 20 driving a piston rod 21 is mounted on the base frame 10 with the piston rod 21 being connected to the support arm 13 by means of a clevis mount 22. Actuation of the piston and cylinder 20 causes the piston rod 21 to extend and contract, thereby raising and lowering the parallelogram linkage and the support frame 16 of the bed.

Referring to FIGS. 1-4, the support frame 16 consists of two tubular rectangular section beams 25 joined together by transverse bars 26 mounted at each end of the beams 25. A weigh frame 30 is mounted on the support frame 16. A patient support 29 is mounted on the weigh frame 30. The weigh frame consists of two inverted U-shaped beams 31 that are shorter than the rectangular beams of the support frame. The rectangular beams of the support frame are nested within the U-shaped beams of the weigh frame with front and rear portions 33 and 34 of the support beam projecting beyond the weigh frame 30.

Near each corner of the weigh frame 30, the weigh frame is connected to the support frame by a vertical load link 35. The load link has an upper end 36 to which an upper spherical bearing 37 is mounted. The load link has a lower end 38 to which a lower spherical bearing 39 is mounted. The upper spherical bearing is connected by a bolt 40 and sleeve 41, or other appropriate means, to the rectangular section beam 25.

The inverted U weigh frame beam 31 has transverse openings 45 and 46 to provide access to the bolt 40 and a nut 47 by which the bolt is secured to the support frame beam 25, and to allow the frame to arc freely as the support frame 16 is tilted with respect to horizontal. The support frame beam 25 has an opening 49 through which the load link 35 passes for connection to the weigh frame beam 31.

The weigh frame beam 31 has lower edges 50 to which a bracket 51 is attached as by welding or bolting. The bracket has two vertical extensions 52 which lie alongside the lower end of the load link 35. A pin 53 passes through the extensions 52 of the bracket 51 and lower spherical bearing 39 to connect the lower spherical bearing 39 and hence the lower end of the load link 35 to the weigh frame beam 31.

The load link 35, absent the integral, spherical bearings, is a commercially available element. It has strain gauges mounted in the area indicated at 60 on the face of the link (see FIG. 4). Electrical cable connections indicated at 61 are made to the strain gauges and connect the strain gauges to a control 63 which is connected to a control readout unit 64 and a central station 65 which function to translate the signals from the strain gauges to a digital weight display as described in U.S. patent application Ser. No. 138,829.

To stabilize the fore and aft relationship of the weigh frame with respect to the support frame, preferably two longitudinal tie rods, one on each side of the bed, are employed. Referring to FIG. 1, one tie rod 70 is mounted on a pivot axis 71 to bracket 15 which is fixed to one of the support frame beams 25. The support frame 16 is pivotable about a transverse axis 73 by means of a piston and cylinder 74 connected between the bracket 15 and the support frame 16. This axis will hereinafter be referred to as the "Trendelenburg axis," for it permits the shifting of the support frame to an inclined Trendelenburg position. The pivot point 71 is located directly vertically below the Trendelenburg axis 73. The other end of the tie rod 70 is connected to the weigh frame at a point 75 that coincides with the axis of the lower spherical bearing by which the link 35 is connected to the weigh frame. The vertical distance between spherical bearing axes and axes 71, 73 is the same. Thus, there is formed a parallelogram linkage with the tie rod 70, the linkage having as its pivot points the axes of the two spherical bearings, the transverse Trendelenburg axis 73 and the pivot connection 71 of the tie rod to the bracket 15. The horizontal links are the tie rod 70 and the support frame beam 25. The vertical links are the load link 35 and the bracket 15 between pivot points 71 and 73.

Side-to-side play can be limited by a vertical bolt 80 from the support frame through a lengthwise slot in the weigh frame (to allow for the Trendelenburg arc).

Figure 5:
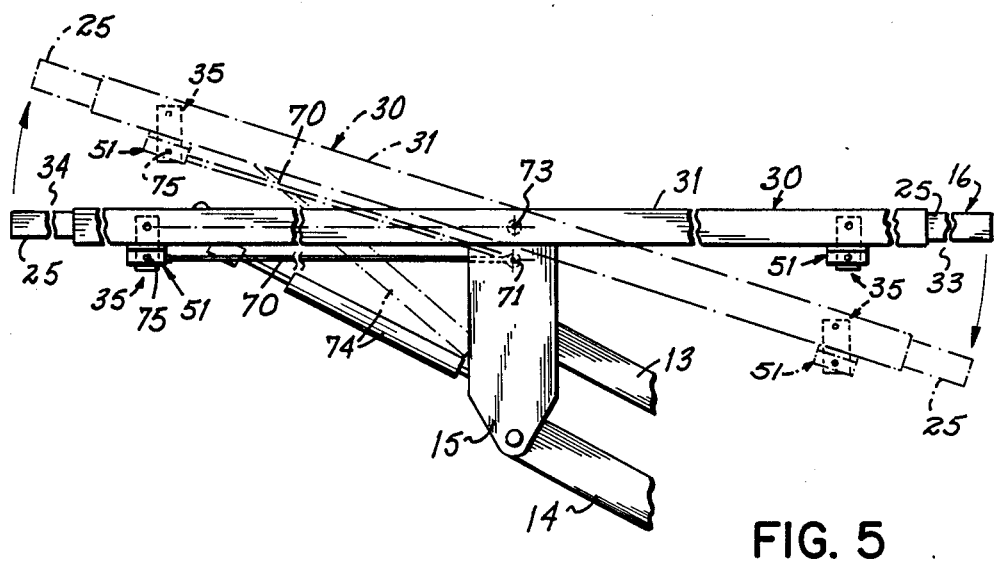
FIG. 5 is kinematic view of the linkages that include load links and tie rod.

The operation is illustrated in FIG. 5. In FIG. 5, the support beam 25 has been shifted to an inclined Trendelenburg position as shown in phantom lines. The parallelogram linkage does not impede the effect of gravity, which maintains the load links 35 at a vertical attitude, yet it does prevent fore-and-aft play when the upper patient support surface is subjected to force or motion. All the weight that is on the weigh frame 30 stresses the four load links 35 in a vertical direction. Thus, the weight sensed by the strain gauges on the respective links does not change even though the angle of the support does significantly change.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

What is claimed is:
1. In a weigh bed,
   a support frame,
   a weigh frame adjacent said support frame,
   a vertical load link near each corner of said weigh frame and having strain gauges mounted thereon,
   spherical bearings connecting said link to said support frame and said weigh frame, respectively, thereby assuring that all the weight of said weigh frame will be applied to said link uni-axially, without error regardless of the angle of inclination of said support frame.
2. In a weigh bed,
   a support frame having opposed longitudinal members of rectangular cross section,
   a weigh frame having opposed longitudinal channel-shaped members into which said support frame longitudinal members are nested,
   a vertical load link near each end of each weigh frame longitudinal member connecting said weigh frame to said support frame,
   at least one strain gauge mounted on each load link,
   and a spherical bearing in said link forming one of the connections of said load link to one of said frames.
3. In a weigh bed as in claim 2 further comprising,
   a transverse bolt passing through said rectangular section member,
   a transverse pin passing through said channel-shaped member below said bolt,
   a first spherical bearing mounted on said bolt and connecting said link to said bolt,
   a second spherical bearing mounted on said pin and connecting said link to said pin.
4. A weigh bed as in claim 2 in which said load link is an S-shaped element having a central section containing said at least one strain gauge, an end section at each end of said central section, said end sections being integral with said central section,
   transverse slots on opposite sides of said element separating said central section from said end sections,
   said spherical bearing being mounted in an end section.
5. A weigh bed comprising, a base, a support frame mounted on said base, means for varying the angle of inclination of said support frame with respect to said base about a transverse axis, a weigh frame adjacent said support frame, a patient support mounted on said weigh frame, a vertical load link having upper and lower ends near each corner of said weigh frame, at least one strain gauge mounted on each load link, and upper and lower spherical bearings connecting the upper and lower ends of said load link to said support frame and weigh frame, respectively.

6. A weigh bed as in claim 5 further comprising, at least one longitudinal tie rod, means pivotally mounting one end of said tie rod to said support frame on a pivot axis below said transverse pivot axis, means pivotally mounting the other end of said tie rod to said weigh frame on the pivot axis of said lower spherical bearing to form a parallelogram linkage having as its pivot points the pivot axes of said spherical bearings, said transverse pivot axis and the pivot axis of said one of said tie rod.

7. A weigh bed as in claim 4 in which said load link is an S-shaped element having a central section containing said at least one strain gauge, an end section at each end of said central section, said end sections being integral with said central section, transverse slots on opposite sides of said element partially separating said central section from said end sections, and said spherical bearing being integrally mounted in each end section.

* * * * *

UNITED STATES PATENT AND TRADEMARK OFFICE
CERTIFICATE OF CORRECTION

PATENT NO. : 4,961,470

DATED : October 9, 1990

INVENTOR(S) : Clement J. Koerber, Sr.

It is certified that error appears in the above-identified patent and that said Letters Patent is hereby corrected as shown below:

Column 6, line 9, after "one" insert -- end -- .

Column 6, line 10, change "4" to -- 5 -- .

Signed and Sealed this

Twenty-fifth Day of February, 1992

Attest:

HARRY F. MANBECK, JR.

*Attesting Officer*  *Commissioner of Patents and Trademarks*